(12) United States Patent
De Samber et al.

(10) Patent No.: US 12,408,632 B2
(45) Date of Patent: Sep. 9, 2025

(54) SYSTEM AND METHOD FOR ANALYZING METING BEHAVIOR OF AN ANIMAL SPECIES

(71) Applicant: SIGNIFY HOLDING B.V., Eindhoven (NL)

(72) Inventors: Marc Andre De Samber, Lommel (BE); Sri Andari Husen, Eindhoven (NL); Vladimir Ossin, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 22 days.

(21) Appl. No.: 18/274,666

(22) PCT Filed: Jan. 28, 2022

(86) PCT No.: PCT/EP2022/051984
§ 371 (c)(1),
(2) Date: Jul. 27, 2023

(87) PCT Pub. No.: WO2022/167328
PCT Pub. Date: Aug. 11, 2022

(65) Prior Publication Data
US 2024/0074412 A1 Mar. 7, 2024

(30) Foreign Application Priority Data
Feb. 2, 2021 (EP) .................................... 21154765

(51) Int. Cl.
*G08B 23/00* (2006.01)
*A01K 29/00* (2006.01)
(Continued)

(52) U.S. Cl.
CPC .............. *A01K 29/005* (2013.01); *G06T 7/20* (2013.01); *G06V 40/10* (2022.01); *G06V 40/20* (2022.01)

(58) Field of Classification Search
CPC ...... A01K 29/005; G06V 40/10; G06V 40/20; G06T 7/20
See application file for complete search history.

(56) References Cited

U.S. PATENT DOCUMENTS 4,503,808 A * 3/1985 McAlister ............ A61D 17/002
600/551
5,566,679 A * 10/1996 Herriott ............. A61B 10/0012
600/551
(Continued)

FOREIGN PATENT DOCUMENTS

CN 108717523 A 10/2018
JP 2017143832 A 8/2017
(Continued)

OTHER PUBLICATIONS

Fazzari et al., Animal Behavior Analysis Methods Using Deep Learning_ A Survey (Year: 2024).*
(Continued)

*Primary Examiner* — Quang Pham

(57) ABSTRACT

A system (100) for analyzing mating behavior of an animal species, comprising: an image-capturing device (110) configured to capture a plurality of time-successive image frames, and a processor (120), wherein the system is configured to detect and track at least one male (130) and female (140) of an animal species, register a motion pattern (150) of at least one of the tracked male and the tracked female, compare the registered motion pattern with a predetermined motion pattern (160), determine the likelihood of an action associated with a mating behavior between the tracked male and the tracked female, and, based on the determined likelihood, capture, via the image-capturing device, a set of time-successive image frames, wherein each image frame set of time-successive frame comprises at least one of the tracked male and the tracked female, and register the motion (Continued)

pattern as a function of the captured set of time-successive image frames.

15 Claims, 6 Drawing Sheets

(51) Int. Cl.
  *G06T 7/20* (2017.01)
  *G06V 40/10* (2022.01)
  *G06V 40/20* (2022.01)

(56) References Cited

U.S. PATENT DOCUMENTS

| | | | | |
|---|---|---|---|---|
| 7,428,345 | B2* | 9/2008 | Caspi | H04N 5/2625 |
| | | | | 348/E5.054 |
| 7,868,769 | B2* | 1/2011 | March | A01K 29/00 |
| | | | | 340/573.1 |
| 7,992,521 | B2* | 8/2011 | Bocquier | A01K 29/005 |
| | | | | 600/587 |
| 8,066,179 | B2* | 11/2011 | Lowe | A61D 17/004 |
| | | | | 235/487 |
| 9,538,730 | B1* | 1/2017 | Torres | A61D 17/004 |
| 10,080,349 | B2* | 9/2018 | Ikeda | A61D 1/08 |
| 10,089,435 | B1* | 10/2018 | Betts-Lacroix | G06F 18/232 |
| 10,575,501 | B2* | 3/2020 | Castro Lisboa | A61D 19/00 |
| 2003/0165216 | A1* | 9/2003 | Walker | A61B 6/544 |
| | | | | 378/108 |
| 2008/0066693 | A1* | 3/2008 | Bocquier | A01K 21/00 |
| | | | | 119/859 |
| 2008/0178819 | A1* | 7/2008 | Sia | A01K 39/04 |
| | | | | 119/300 |
| 2011/0246223 | A1* | 10/2011 | Rundensteiner | G16H 40/67 |
| | | | | 705/2 |
| 2014/0015945 | A1* | 1/2014 | Bench | A61B 5/6887 |
| | | | | 119/421 |
| 2015/0302241 | A1* | 10/2015 | Eineren | G06V 40/10 |
| | | | | 382/110 |
| 2015/0327518 | A1* | 11/2015 | Han | A61D 17/00 |
| | | | | 348/143 |
| 2016/0063310 | A1* | 3/2016 | Okamoto | H04N 23/957 |
| | | | | 348/143 |
| 2016/0078286 | A1* | 3/2016 | Tani | H04N 5/772 |
| | | | | 348/143 |
| 2017/0000081 | A1* | 1/2017 | Betts-Lacroix | A61B 5/7264 |
| 2017/0000905 | A1* | 1/2017 | Betts-Lacroix | G01N 33/497 |
| 2017/0000906 | A1* | 1/2017 | Betts-Lacroix | A01K 1/031 |
| 2019/0037800 | A1* | 2/2019 | Betts-Lacroix | A01K 29/005 |
| 2019/0037801 | A1* | 2/2019 | Betts-Lacroix | A61B 5/7246 |
| 2019/0037810 | A1* | 2/2019 | Betts-Lacroix | A01K 1/031 |
| 2019/0037811 | A1* | 2/2019 | Betts-Lacroix | A01K 1/00 |
| 2019/0042692 | A1* | 2/2019 | Betts-Lacroix | G16H 50/20 |
| 2019/0191665 | A1* | 6/2019 | Schaevitz | A01K 1/031 |
| 2020/0125849 | A1* | 4/2020 | Labrecque | A01K 5/02 |
| 2020/0219271 | A1* | 7/2020 | Davis | G06T 7/277 |
| 2020/0375148 | A1* | 12/2020 | Magazzù | A61B 5/0002 |
| 2021/0227796 | A1* | 7/2021 | Lopez Galarza | A01K 29/005 |
| 2022/0125023 | A1* | 4/2022 | Messinger | G02C 7/04 |
| 2023/0094942 | A1* | 3/2023 | Singh | G08B 13/19671 |
| | | | | 381/57 |
| 2024/0046493 | A1* | 2/2024 | Murata | G06T 7/251 |
| 2024/0188557 | A1* | 6/2024 | Karounos | A01M 29/16 |

FOREIGN PATENT DOCUMENTS

| | | |
|---|---|---|
| KR | 1694946 B1 | 1/2017 |
| KR | 101694946 B1 | 1/2017 |
| KR | 1837026 B1 | 3/2018 |
| WO | 2007103886 A2 | 9/2007 |
| WO | 2010064892 A1 | 6/2010 |

OTHER PUBLICATIONS

Fujibayashi et al., A Behavioral Analysis System MCFBM Enables Objective Inference of Songbirds Attention During Social Interactions (Year: 2024).*
Lei et al., Oestrus Analysis of Sows Based on Bionic Boars and Machine Vision Technology (Year: 2021).*
Lin et al., Video-based Bird Posture Recognition Using Dual Feature-rates Deep Fusion Convolutional Neural Network (Year: 2022).*
Nasirahmadi et al., Implementation of Machine Vision for Detecting Behaviour of Cattle and Pigs (Year: 2017).*
Tsai et al., A Motion and Image Analysis Method for Automatic Detection of Estrus and Mating Behavior in Cattle (Year: 2014).*
Pereira et al., "Machine vision to identify broiler behavior", Computers and Electronics in Agriculture 99 (2013) 194-199.
Shi et al., "Mating Behaviour and Fertility of Layer Breeders in Natural Mating Colony Cages: LED Light Environmental Effects", Research Square 25 pgs.
Tsai et al., "A motion and image analysis method for automatic detection of estrus and mating behavior in cattle", Computers and Electronics in Agriculture 104 (2014) 25-31.
Wurtz et al., "Recording behaviour of indoor-housed farm animals automatically using machine vision technology: A systematic review", Dec. 23, 2019.
Zaguri et al., "Targeted differential monochromatic lighting improves broiler breeder reproductive performance", Physiology and Reproduction, 12 pgs.

* cited by examiner

SYSTEM AND METHOD FOR ANALYZING METING BEHAVIOR OF AN ANIMAL SPECIES

CROSS-REFERENCE TO PRIOR APPLICATIONS

This application is the U.S. National Phase application under 35 U.S.C. § 371 of International Application No. PCT/EP2022/051984, filed on Jan. 28, 2022, which claims the benefit of European Patent Application No. 21154765.8, filed on Feb. 2, 2021. These applications are hereby incorporated by reference herein.

FIELD OF THE INVENTION

The present invention generally relates to analysis of mating behaviors of an animal species. More specifically, the present invention relates to methods and systems for analyzing mating behaviors of an animal species based on image analysis.

BACKGROUND OF THE INVENTION

There is a general need to increase the efficiency in livestock management, and various Key Performance Indices, KPIs, apply depending on the animal type and the phase of life of these animals. For example, in the field of chicken breeding, including e.g. providing fertilized eggs, hatching of chicks and/or setting up new flocks of chicken, a key metric is to have a controlled and high percentage level of fertilized eggs.

One of the factors that defines the KPIs of animal breeding is the mating of the animals. For example, in the case of chicken breeding, the mating of the birds encompasses a relatively complex interaction between roosters and hens. Observing and analyzing the behavior of the birds, i.e. the interaction between roosters and hens, and ultimately the mating action between them, constitutes an important input and/or tool to a farmer of the quality of the mating action. Hitherto, the only available analysis of the mating actions or behavior is made by a person (e.g. a farmer) observing and interpreting the mating action of behavior of the animals. Consequently, in case of chicken breeding, the final outcome of mating and hence the fertilized egg percentage can only be observed by either the hatching results or the analysis of the eggs, e.g. by so called candling.

However, there are numerous problems related to manual observation of mating behaviors of animals. For example, the manual observation requires the presence of one or several persons for observation and interpretation. Furthermore, the person(s) observing the mating behaviors of animals may not have the adequate experience to draw qualitative conclusions of the observed behaviors. Also, manual observation according to the above may be inconvenient as well as cost- and/or time inefficient. Furthermore, the effective mating action (insertion of semen) may happen relatively fast. For example, in case of bird (e.g. chicken) breeding, the effective mating action is difficult to trace manually, particularly in a relatively large bird population.

Hence, it is desired to provide an automated tool for analyzing the behavior of a group of animals of a species, such as a mixed chicken population of hens and roosters, related to sexual activity and mating.

SUMMARY OF THE INVENTION

It is an object of the present invention to provide a system, method and computer program which may provide an automated analysis of the behavior of a group of male and female animals of a species, related to sexual activity and mating.

This and other objects are achieved by providing a system, method and computer program having the features in the independent claim. Preferred embodiments are defined in the dependent claims.

Hence, according to a first aspect of the present invention, there is provided a system for analyzing mating behavior of an animal species. The system comprises at least one image-capturing device configured to capture a plurality of time-successive image frames. The system further comprises a processor, wherein the system is configured to, via the processor, detect at least one male of an animal species based on at least one image frame of the animal species captured by the at least one image-capturing device, and detect at least one female of an animal species based on at least one image frame of the animal species captured by the at least one image-capturing device. The system is further configured to track a male of the detected at least one male of the animal species based on at least one image frame of the animal species captured by the at least one image-capturing device, and to track a female of the detected at least one female of the animal species based on at least one image frame of the animal species captured by the at least one image-capturing device. The system is further configured to register at least one motion pattern of at least one of the tracked male and the tracked female, compare the registered at least one motion pattern with at least one predetermined motion pattern, and determine the likelihood of at least one action associated with a mating behavior between the tracked male and the tracked female based on the comparison of the registered at least one motion pattern with the at least one predetermined motion pattern. The system may be further configured to, based on the determined likelihood, capture, via the at least one image-capturing device, at least one set of time-successive image frames, wherein each image frame of the at least one set of time-successive frame comprises at least one of the tracked male and the tracked female, and register the at least one motion pattern as a function of the captured at least one set of time-successive image frames.

According to a second aspect of the present invention, there is provided a method for analyzing mating behavior of animals using a processor. The method comprises detecting at least one male of an animal species based on at least one image frame of the animal species, and detecting at least one female of an animal species based on at least one image frame of the animal species. The method further comprises tracking a male of the detected at least one male of the animal species based on at least one image frame of the animal species, and tracking a female of the detected at least one female of the animal species based on at least one image frame of the animal species. The method further comprises registering at least one motion pattern of at least one of the tracked male and the tracked female, comparing the registered at least one motion pattern with at least one predetermined motion pattern, and determining the likelihood of at least one action associated with a mating behavior between the tracked male and the tracked female based on the comparison of the registered at least one motion pattern with the at least one predetermined motion pattern. The method may further comprise, based on the determined likelihood, capturing, via the at least one image-capturing device, at least one set of time-successive image frames, wherein each image frame of the at least one set of time-successive frame comprises at least one of the tracked male and the tracked female, and registering the at least one motion pattern as a function of the captured at least one set of time-successive image frames.

According to a third aspect of the present invention, there is provided a computer program comprising computer readable code for causing a computer to carry out the steps of the method according to the second aspect of the present invention when the computer program is carried out on the computer.

Thus, the present invention is based on the idea of providing an automated analysis of the behavior of a group of male and female animals of a species, related to sexual activity and mating. The analysis is performed by detecting and tracking one or more male and female animals, and analyzing their motion pattern(s). In case action(s) are associated with a mating behavior based on the motion pattern(s), the system may focus on the male and/or female animal for an even further improved registering of the motion pattern(s) and determination of action(s). Consequently, the system achieves an improved prediction and/or monitoring of the sexual activity and mating of the animal species.

The present invention is advantageous in that the system is able to accurately predict and/or monitor the mating behavior between the tracked male(s) and tracked female(s) of the animal species by its adaptive and input-responsive segmentation or field of view to capture the required (sequential) data. Hence, even though the scene that needs to be analyzed may change (constantly) during the mating, thereby resulting in a complex sequence of events/scenes during the mating activity, the system may efficiently change/shift the vision fields/segmentations by the detection and tracking, followed by the adaptive image-capturing devices.

The present invention is further advantageous in that the determination of the likelihood of action(s) associated with a mating behavior between the tracked male and the tracked female not only may lead to a determination of a probability or likelihood of an actual mating between a male and a female (i.e. semen injection), but may also indicate proposed actions in order to promote or impede the mating.

The system for analyzing mating behavior of an animal species comprises at least one image-capturing device configured to capture a plurality of time-successive image frames. By the term "image-capturing device", it is here meant substantially any device, unit or arrangement which is able to capture a plurality of time-successive image frames, such as a camera, a film camera, or the like. The system further comprises a processor, wherein the system is configured to, via the processor, detect at least one male of an animal species based on at least one image frame of the animal species captured by the at least one image-capturing device, and detect at least one female of an animal species based on at least one image frame of the animal species captured by the at least one image-capturing device. In other words, via the processor, the system is configured to detect male(s) and female(s) of the animal species based on the image frame(s) provided by the image-capturing device(s). For example, the system may be configured to detect male(s) and female(s) of the animal species based on the image frame(s) via image analysis, e.g. comprising pattern recognition.

The system is further configured to track a male of the detected at least one male of the animal species, and to track a female of the detected at least one female of the animal species. By the term "track", it is here meant to monitor, register and/or follow as a function of time. Hence, the system is configured to track one or more males of the detected one or more males of the animal species, and analogously, to track one or more females of the detected one or more females of the animal species.

The system is further configured to register at least one motion pattern of at least one of the tracked male and the tracked female. By the term "motion pattern", it is here meant a set of (recognizable) motions and/or movements which may be repeated. Hence, the system is configured to register one or more motion patterns, e.g. as a set of (recognizable) motions and/or movements, of the tracked male and/or female.

The system is further configured to compare the registered at least one motion pattern with at least one predetermined motion pattern. By the term "predetermined motion pattern", it is here meant a motion pattern which is set, determined and/or stored in advance, e.g. by the system.

The system is further configured to determine the likelihood of at least one action associated with a mating behavior between the tracked male and the tracked female based on the comparison of the registered at least one motion pattern with the at least one predetermined motion pattern. By the term "at least one action associated with a mating behavior", it is here meant one or more actions associated and/or related to a mating behavior such as one or more of a courtship behavior, a mating (copulation or sexual intercourse), an indicative behavior after mating, etcetera, of the male and/or the female. Hence, the system is configured to determine the likelihood, probability and/or plausibility of one or more actions associated and/or related with a mating behavior between the tracked male and female based on the comparison of the motion pattern(s) with the predetermined motion pattern(s).

The system is further configured to, based on the determined likelihood, capture, via the at least one image-capturing device, at least one set of time-successive image frames, wherein each image frame of the at least one set of time-successive frames comprises at least one of the tracked male and the tracked female, and register the at least one motion pattern as a function of the captured at least one set of time-successive image frames. Hence, the system is configured to, based on the determined likelihood, capture, via the image-capturing device(s), one or more sets of time-successive image frames, wherein each image frame of the set(s) comprises the tracked male and/or the tracked female, and register the motion pattern(s) as a function of the captured set(s), whereby the system may use the registered motion pattern(s) iteratively in the comparison with the predetermined motion pattern(s) and the subsequent likelihood determination for an even further improved analysis and/or monitoring of the sexual activity and mating of the animal species.

According to an embodiment of the present invention, the system may further be configured to register a first motion pattern of the tracked male and the tracked female, capture, via the at least one image-capturing device, a first set of time-successive image frames, wherein each image frame of the first set of time-successive frame comprises the tracked male and the tracked female, and compare the registered first motion pattern with a predetermined first motion pattern of a male and a female of the animal species. Hence, the system may be configured to register a first motion pattern of both the tracked male and female, to capture a first set of image frames comprising both the tracked male and female and compare the registered first motion pattern with a predetermined first motion pattern. The present embodiment is advantageous in that the system may efficiently and conveniently determine the likelihood of action(s) associated with a mating behavior, e.g. a mating (copulation or sexual intercourse) between the male and the female, based on the comparison of the registered first motion pattern with a predetermined first motion pattern.

According to an embodiment of the present invention, the system may further be configured to estimate the distance between the tracked male and the tracked female as a function of time, and register the first motion pattern of the tracked male and the tracked female based on the estimated distance between the tracked male and the tracked female as a function of time. The present embodiment is advantageous in that the estimated distance between the male and the female may to an even further extent improve the registered first motion pattern of the tracked male and female, which in turn may lead to an even more accurate prediction of action(s) associated with a mating behavior between the male and the female. Furthermore, according to an example, the system may further be configured to determine that the estimated distance between the tracked male and the tracked female is within a predetermined interval during a time period, and register the first motion pattern of the tracked male and the tracked female based on the estimated distance between the tracked male and the tracked female within the predetermined interval during the time period. Hence, the system may be configured to determine that the tracked male and the tracked female may remain at a certain distance, or within a distance interval, from each other.

According to an embodiment of the present invention, the predetermined first motion pattern may comprise a circulation by a male of the animal species around a female of the animal species. In other words, the predetermined first motion pattern may comprise a courtship behavior of the male with respect to the female by a male's circulation around the female. The present embodiment is advantageous in that the present first motion pattern of the male and the female is strongly indicative of a courtship behavior of a mating behavior of the male and the female.

According to an embodiment of the present invention, the system may further be configured to register a second motion pattern of the tracked male, capture, via the at least one image-capturing device, a second set of time-successive image frames, wherein each image frame of the second set of time-successive frame comprises the tracked male, and compare the registered second motion pattern with a predetermined second motion pattern of a male of the animal species. Hence, the system may be configured to register a second motion pattern of (only) the tracked male, to capture a second set of image frames comprising the tracked male and compare the registered second motion pattern with a predetermined second motion pattern. The present embodiment is advantageous in that the system may efficiently and conveniently determine the likelihood of action(s) associated with a mating behavior, e.g. a crowing behavior of the male in case of a bird species such as chicken, based on the comparison of the registered second motion pattern with a predetermined second motion pattern.

According to an embodiment of the present invention, the system may further be configured to register a third motion pattern of the tracked female, capture, via the at least one image-capturing device, a third set of time-successive image frames, wherein each image frame of the third set of time-successive frame comprises the tracked female, and compare the registered third motion pattern with a predetermined third motion pattern of a female of the animal species. Hence, the system may be configured to register a third motion pattern of (only) the tracked female, to capture a third set of image frames comprising the tracked female and compare the registered third motion pattern with a predetermined third motion pattern. The present embodiment is advantageous in that the system may efficiently and conveniently determine the likelihood of action(s) associated with a mating behavior, e.g. a fluffing behavior of the female in case of a bird species such as chicken, based on the comparison of the registered third motion pattern with a predetermined second motion pattern.

According to an embodiment of the present invention, the system may further be configured to determine a number, $N_1$, of the detected at least one male of the animal species, determine a number, $N_2$, of the detected at least one female of the animal species, determine a ratio, $N_2/N_1$, between the number of the detected at least one female of the animal species and the number of the detected at least one male of the animal species, and track the male of the detected at least one male of the animal species based on the ratio. Hence, the system may be configured to determine a ratio, $N_2/N_1$, between the number of detected female(s) with respect to the number of detected male(s), and track the male based on this ratio. The present embodiment is advantageous in that the system may be configured to initialize the tracking of the male and/or female based on the ratio, thereby even further improving the efficiency of the system. For example, the system may be configured to initialize the tracking of the male and/or female in case the ratio, $N_2/N_1$, is larger than a threshold value, e.g. 10. Furthermore, according to an example, the system may be configured to determine a ratio, $N_2/N_1$, between the number of the detected at least one female of the animal species and the number of the detected at least one male of the animal species as a function of time, and determine the likelihood of a mating between the tracked male and the tracked female based on the ratio as a function of time.

According to an embodiment of the present invention, the system may further be configured to detect a plurality of females of the animal species within a predetermined radius of the detected at least one male, and track the male of the detected at least one male of the animal species based on the detected plurality of females of the animal species. Hence, the system may be configured to detect a plurality (number) of females around the detected male(s) and track the male based on this information. It will be appreciated that the system may be configured to set the predetermined radius as a function of the animal species to analyze and/or monitor, wherein a relatively large radius may be set for relatively large animals, and analogously, a relatively small radius may be set for relatively small animals.

According to an embodiment of the present invention, the system may be configured to determine the likelihood of a mating between the tracked male and the tracked female based on the determined likelihood of the at least one action associated with the mating behavior between the tracked male and the tracked female. The system may be further configured to present the determined likelihood of mating between the tracked male and the tracked female on a user interface. By the term "mating", it is here meant the copulation or sexual intercourse between the tracked male and female. The present embodiment is advantageous in that the system may efficiently and conveniently determine the likelihood or probability of the mating between the male and the female, based on the comparison of the registered first motion pattern with a predetermined first motion pattern.

According to an embodiment of the present invention, the animal species may be chicken, whereby a male of the animal species is a rooster and a female of the animal species is a hen.

According to an embodiment of the present invention, the system may further comprise at least one audio recording device, wherein the system is further configured to via the at least one audio recording device, record at least one audio input from at least one of the tracked male and the tracked female, and register the at least one motion pattern of at least one of the tracked male and the tracked female based on the at least one audio input. By the term "audio recording device", it is here meant substantially any device, unit or arrangement which is configured to record or register sound (audio input). Hence, the system is configured to record audio input(s) from the tracked male and/or tracked female, and register the motion pattern(s) of the tracked male and/or the tracked female based on the audio input(s). It will be appreciated that the motion pattern and the audio input(s) may be (strongly) interrelated, i.e. a characterizing sound of the male and/or female during a mating behavior. The present embodiment is advantageous in that a motion pattern, as also based on audio input(s), may be correctly registered even if the view of the image-capturing devices may be limited. The present embodiment is advantageous in that an even more efficient and accurate determination of the likelihood, probability and/or plausibility of one or more actions associated and/or related with a mating behavior between the tracked male and female may be achieved.

According to an embodiment of the present invention, there is provided an arrangement for influencing mating behavior of an animal species. The arrangement comprises the system of any one of the preceding embodiments, wherein the system is further configured to, via the processor, detect at least one male of an animal species in a space. The arrangement further comprises at least one light-emitting device arranged to emit light in the space, wherein the system is further configured to, based on at least one of the registered at least one motion pattern and the determined likelihood, control at least one property of the emitted light of the at least one light-emitting device. The present embodiment is advantageous in that the mating behavior of the animal species may be conveniently and efficiently influenced, e.g. promoted or impeded, by the control of the emission of the light from the light-emitting device(s). For example, in case the system determines a relatively low likelihood of one or more actions associated with a mating behavior, the system may be configured to control one or more properties of the light from the light-emitting device(s) emitted in the space, in order to promote the activity of the male(s) related to mating. Analogously, in case the system determines a relatively high likelihood of one or more actions associated with a mating behavior, the system may be configured to control one or more properties of the light from the light-emitting device(s) emitted in the space, in order to impede or obstruct the activity of the male(s) related to mating.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
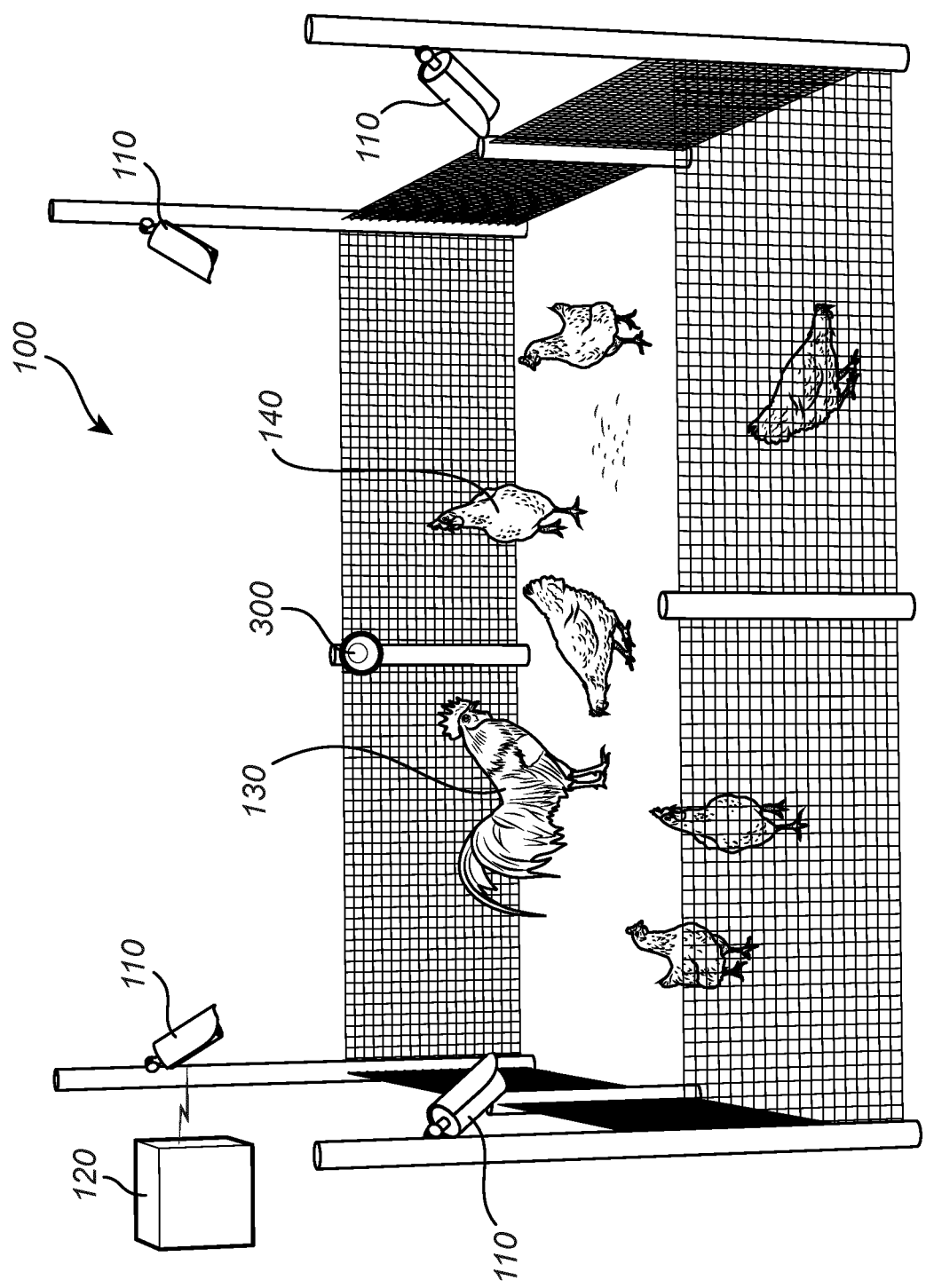
FIG. 1 schematically shows a system according to an exemplifying embodiment of the present invention, FIGS. 2-5 schematically show registrations of motion pattern(s) by a system according to an exemplifying embodiment of the present invention, FIG. 6 schematically shows a detection and tracking by a system according to an exemplifying embodiment of the present invention, FIG. 7 schematically shows an arrangement comprising a system according to an exemplifying embodiment of the present invention, and FIG. 8 schematically shows a method according to an exemplifying embodiment of the present invention.

FIG. 1 schematically shows a system 100 for analyzing mating behavior of an animal species according to an exemplifying embodiment of the present invention. Here, the animal species is exemplified as chicken, whereby a male 130 of the animal species is a rooster and a female 140 of the animal species is a hen, but it should be noted that the system 100 may be applied to other kinds of animal species.

The system 100 comprises image-capturing devices 110, exemplified as a plurality of cameras 110. The plurality of cameras 110 are physically (spatially) separated, i.e. arranged at different locations. Furthermore, the plurality of cameras 110 may be arranged at different heights and/or distances with respect to the area(s) which the plurality of cameras 110 are configured or arranged to monitor. The cameras 110 are configured to capture a plurality of time-successive image frames of the male(s) 130 and/or the female(s) 140 of the animal species. For example, the cameras 110 may be controllable (steerable) and have a focused Field-Of-View (FoV) that may follow a scene evolution of the male(s) 130 and the female(s) 140. Hence, the cameras 110 may be mechanically movable (i.e. motor-operated), but it should be noted that a full view of the space in which the animal species is present (e.g. a stable) may be obtained by a fixed set of cameras 110 with a fixed FoV.

The system 100 further comprises a processor 120, which is schematically indicated. One or more of the cameras 110 may be communicatively connected to the processor 120. Via the processor 120, the system 100 is configured to detect at least one male 130 of the animal species based on at least one image frame of the animal species captured by the camera(s) 110, and detect at least one female 140 of the animal species based on at least one image frame of the animal species captured by the camera(s) 110. The system 100 is further configured to track a male of the detected male(s) 130, and to track a female of the detected female(s) 140. In case the tracked male 130 and/or tracked female move out of the view of the camera(s) 110, the system 100 may be configured to re-select the scene with another segmentation. The system 100 may, for example, perform the detection and/or tracking of the male(s) 130 and the female(s) 140 via convolutional neural networks (CNNs) which are used as hierarchical feature extractors. There are several extensions developed for further processing of these features to address particular tasks such as image classification, semantic segmentation, instance segmentation, object detection and tracking, etc. The extensions together with the corresponding feature extractors form the overall architecture of the neural network for a particular task. Examples of architectures may comprise the so-called Mask-RCNN (regional CNN), Tracktor, Optimal Speed and Accuracy of object Detection (YOLO), Multi-Object Tracking and Segmentation (MOTS).

The system 100 is further configured to register at least one motion pattern of the tracked male 130 and/or the tracked female 140, compare the registered motion pattern(s) with at least one predetermined motion pattern, and determine the likelihood of at least one action associated with a mating behavior between the tracked male 130 and the tracked female 140 based on the comparison of the registered motion pattern(s) with the predetermined motion pattern(s). The system 100 is further configured to, based on the determined likelihood, capture, via the camera(s) 110, at least one set of time-successive image frames, wherein each image frame of the at least one set of time-successive frames comprises the tracked male 130 and/or the tracked female 140, and register the motion pattern(s) as a function of the captured set(s) of time-successive image frames. The camera(s) 110 may, initially or at the start of a new image-capturing cycle, be configured to capture a plurality of time-successive image frames of the male(s) 130 and/or the female(s) 140 in a full FoV. Thereafter, based on the determined likelihood, the camera(s) 110 may be configured to capture the set(s) of time-successive image frames of the tracked male 130 and/or the tracked female 140 in a "zoomed" view. Hence, the camera(s) 110, at least initially, may be configured to capture a full FoV, and by (adaptive) framing select images/sequences for analysis via the system 100. It should be noted that the system 100 may be configured to control the camera(s) 110 based on the movements of the tracked male(s) 130 and/or the tracked female(s) 140. For example, a tracked male 130 and a tracked female 140 may move from the FoV of a first camera 110 into the FoV of a second camera 110, and the second camera 110 may thereby "take over" the capturing of time-successive image frames from the first camera 110.

According to the example in FIG. 1, the system 100 optionally comprises at least one audio recording device 300, which is exemplified as a microphone 300. Via the microphone 300, the system 100 is configured to record at least one audio input from the tracked male 130 and/or the tracked female 140, and register the motion pattern(s) of the tracked male 130 and/or the tracked female 140 based on the audio input(s).

FIGS. 2-4 schematically show registrations of motion patterns of the tracked male 130 and/or the tracked female 140 according to exemplifying embodiments of the present invention.

Figures 2A, 2B, 2C:
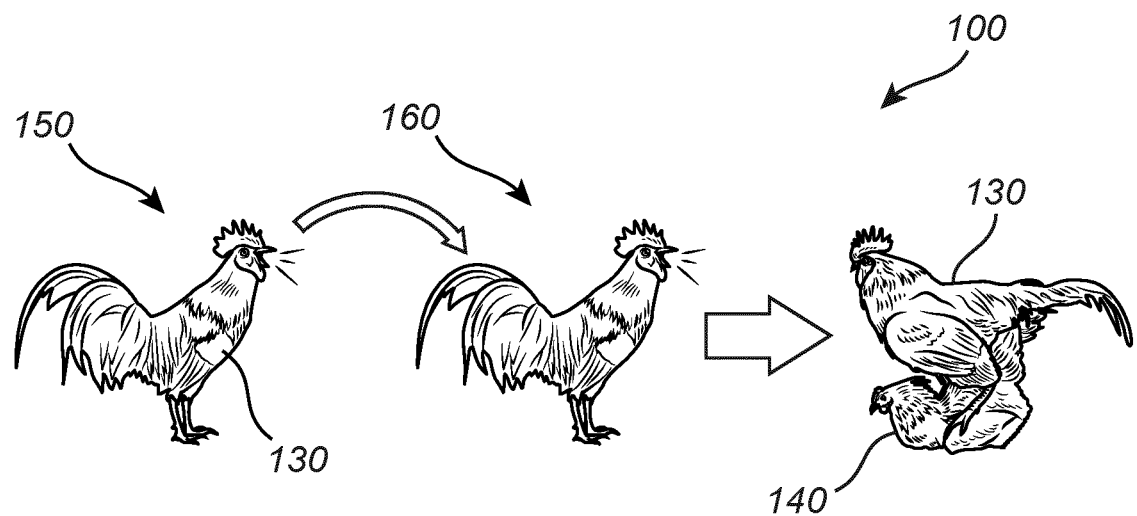

In FIG. 2a, the system 100 has detected a male (rooster) 130 of the animal species (chicken), and tracks the male 130, according to FIG. 1 and the associated text. The system 100 is further configured to register at least one motion pattern 150 of the tracked male 130 and compare the registered motion pattern(s) 150 with at least one predetermined motion pattern 160 of a male of the animal species, shown in FIG. 2b. In this specific case as exemplified, the predetermined motion pattern 160 comprises a crowing behavior of the male (rooster) 130, and the system 100 may hereby be configured to compare the motion pattern(s) 150 as registered of the male 130 with the predetermined motion pattern(s) 160. It should be noted that the system 100 may perform the comparison based on image analysis, e.g. comprising pattern recognition. The system 100 may perform the comparison using a neural network which has been trained with the predetermined motion pattern(s) associated with mating scenes and/or images.

Furthermore, the system 100 may further use one or more audio input(s), registered by one or more audio recording device(s) as exemplified in FIG. 1, and register the motion pattern 150 based on the audio input(s) (e.g. crowing sound(s)). Based on this comparison of the registered motion pattern(s) 150 with the predetermined motion pattern(s) 160 according to FIGS. 2a and 2b, the system 100 may determine the likelihood of at least one action associated with a mating behavior between the tracked male 130 and the tracked female 140 as shown in FIG. 2c. For example, the system 100 may determine that the likelihood or probability that the male 130 performs a mating behavior such as a crowing behavior is relatively high, or very high. Based on this determined likelihood, the system 100 may thereafter capture, via the camera(s), at least one set of time-successive image frames, wherein each image frame of the at least one set of time-successive frame comprises the tracked male 130 and/or the tracked female 140, and register the motion pattern(s) 150 as a function of the captured set(s) of time-successive image frames. For example, and according to FIGS. 2a and 2b, based on the determined likelihood of the crowing behavior of the male (rooster) 130, the system 100 may be configured to compare the motion pattern of the tracked male 130 and the tracked female 140 by the captured set(s), e.g. in an iterative manner, with a predetermined motion pattern of a mating behavior such as a sexual intercourse (mating) between a male and a female, as shown in FIG. 2c. Hence, the system 100 may focus on the tracked male 130 and/or tracked female 140 for an even further improved registering of the motion pattern(s), thereby achieving an improved prediction and/or monitoring of the sexual activity and mating of the animal species.

Figures 3A, 3B, 3C:
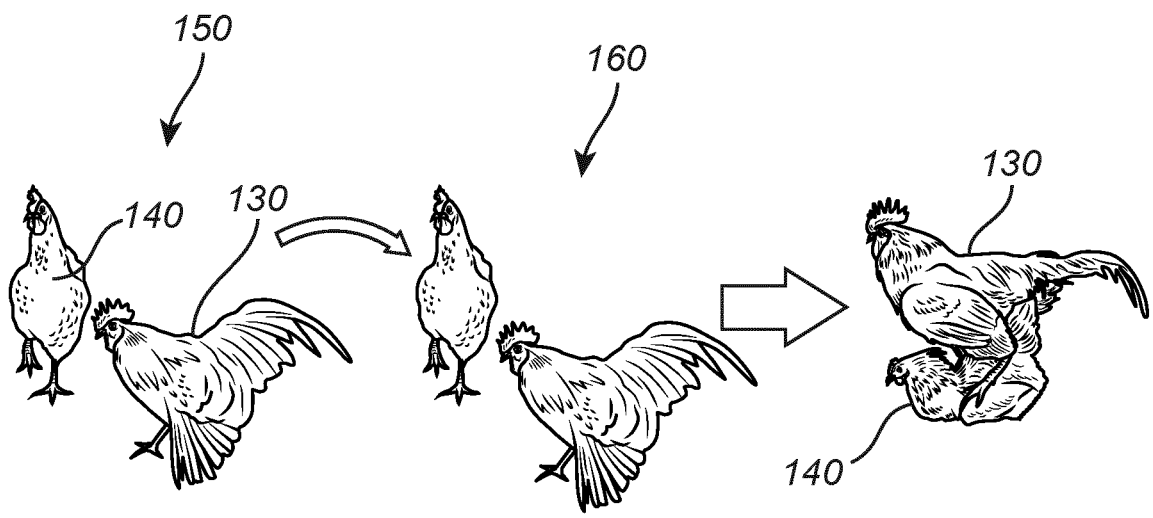

In FIG. 3a, the system 100 has detected a male (rooster) 130 and a female (hen) 140 of the animal species (chicken), and tracks the male 130 and the female 140, according to FIG. 1 and the associated text. The system 100 is further configured to register motion pattern(s) 150 of the tracked male 130 and tracked female 140, as shown in FIG. 3a, and compare the registered motion pattern(s) 150 with at least one predetermined motion pattern 160 of a male and a female of the animal species as shown in FIG. 3b. In this specific case as exemplified, the predetermined motion pattern 160 comprises a courtship behavior of the male (rooster) 130. It will be appreciated that the courtship behavior may comprise different kinds of courtship behavior(s), e.g. a circulation by a male of the animal species around a female of the animal species. According to FIGS. 3a and 3b, the system 100 may hereby be configured to compare the motion pattern(s) 150 as registered of the tracked male 130 and the tracked female 140 with the predetermined motion pattern(s) 160. Analogously with the text of FIGS. 2a and 2b, the system 100 may perform the comparison based on image analysis, e.g. comprising pattern recognition and/or audio input(s). Based on this comparison of the registered motion pattern(s) with the predetermined motion pattern(s), the system 100 may determine the likelihood of at least one action associated with a mating behavior between the tracked male 130 and the tracked female 140. For example, the system 100 may determine that the likelihood or probability that the male 130 performs a mating behavior with respect to the tracked female 140 such as a courtship behavior is relatively high, or very high. Based on this determined likelihood, the system 100 may thereafter capture, via the camera(s), at least one set of time-successive image frames, wherein each image frame of the at least one set of time-successive frame comprises the tracked male 130 and the tracked female 140, and register the motion pattern(s) as a function of the captured set(s) of time-successive image frames. For example, and according to FIGS. 3a and 3b, based on the determined likelihood of the courtship behavior of the male (rooster) 130 with respect to the female (hen) 140, the system 100 may be configured to compare the motion pattern of the tracked male 130 and the tracked female 140 by the captured set(s), e.g. in an iterative manner, with a predetermined motion pattern of a mating behavior such as a sexual intercourse (mating) between a male and a female, as shown in FIG. 3c.

Figures 4A, 4B:
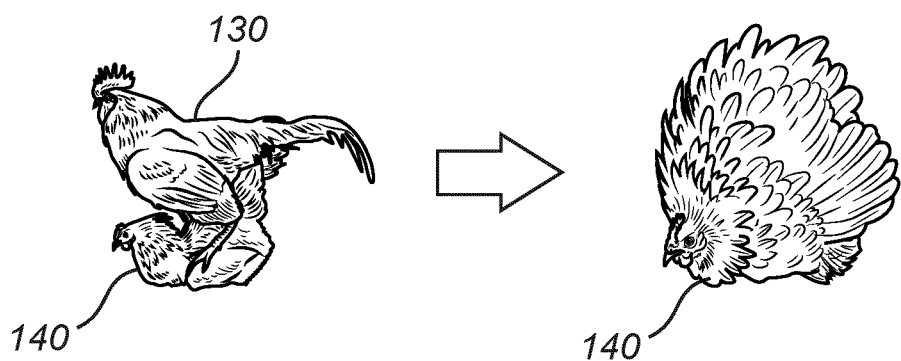

Whereas FIGS. 2 and 3 are related to motion pattern(s) of the tracked male 130 and/or tracked female 140 of the animal species which may be associated with mating behaviors (e.g. a crowing behavior of the male (rooster) 130 in FIG. 2a and/or the courtship behavior of the male (rooster) 130 with respect to the female (hen) 140) in FIG. 3a before a sexual intercourse (mating), it will be appreciated that the system 100 alternatively, or in combination, may be configured to analyze motion pattern(s) which may be associated with mating behaviors after a sexual intercourse (mating). For example, as shown in FIG. 4b, the system 100 has detected a female (hen) 140 of the animal species (chicken), and tracks the female 140, according to FIG. 1 and the associated text. In this specific case as exemplified, the predetermined motion pattern comprises a fluffing behavior (post coitum) of the female (hen) 140. For example, the system 100 may determine that the likelihood or probability that the female 140 performs a mating behavior such as a fluffing behavior, or any other behavior post coitum, is relatively high, or very high. Based on this determined likelihood, the system 100 may determine the likelihood or probability that a mating behavior such as a sexual intercourse (mating) between a male 130 and the female 140 has taken place, as shown in FIG. 4a.

Hence, common for FIGS. 2-4 is that the system 100 may, based on the motion pattern(s) of the tracked male 130 and/or tracked female 140, focus on the tracked male 130 and/or tracked female 140 for an even further improved registering of the motion pattern(s), thereby achieving an improved prediction and/or monitoring of the sexual activity and mating of the animal species. It should be noted that a mating between a male and a female of an animal species may include a sequence of events, and the system 100 may determine the likelihood or probability that a mating behavior takes place and/or has taken place with likelihood or estimation numbers or intervals, which may be based on e.g. expert knowledge and/or calibration (human observations). For example, in case the system 100 determines that the likelihood or probability of an action associated with a mating behavior between the tracked male and the tracked female such as a courtship behavior, e.g. a circulation by the tracked male around the tracked female, is high, very high, or even more or less certain, the likelihood of that mating will take place may be e.g. 10-30%, such as e.g. 20%. It should be noted that the system 100 may determine the likelihood of mating taking place based on one or more (other) conditions. For example, the system 100 may be configured to determine a ratio between a number of the detected female(s) 140 and a number of the detected male(s) 130 of the animal species as a function of time, and determine the likelihood of mating based on the ratio as a function of time. For example, in case of an action such as a courtship, the system 100 may be configured to detect a decrease in the ratio caused by an (interrupting and/or disturbing) male 130. Accordingly, the system 100 may be configured to determine that the likelihood of mating decreases due to this interruption.

According to another example, in case the system 100 determines that the likelihood or probability of an action associated with a mating behavior between the tracked male and the tracked female such as a "mounting" of the tracked male on the tracked female is high, very high, or even more or less certain, the likelihood that the mating will be effective (i.e. injection of semen into the tracked female) may be e.g. 60-80%, such as e.g. 70%. Again, the system 100 may be configured to determine a decrease of the likelihood of a mating in case of conditions such as an interrupting and/or disturbing male 130. As yet another example, in case the system 100 determines that the likelihood or probability of an action associated with a mating behavior between the tracked male and the tracked female such as a fluffing behavior of the tracked female, is high, very high, or even more or less certain, the likelihood that the mating has been effective (i.e. injection of semen into the tracked female has occurred) may be e.g. 80-95%, such as e.g. 90%.

It will be appreciated that the system 100 may be able to capture and/or analyze a multiple of mating behavior actions (finished or interrupted) at the same time and/or sequentially. For example, the system 100 may capture a multiple of mating behavior actions in parallel as a means to quantify the mating in a space in which the animal species is present (e.g. a stable) or of a representative part (statistical part) of the space.

Figure 5:
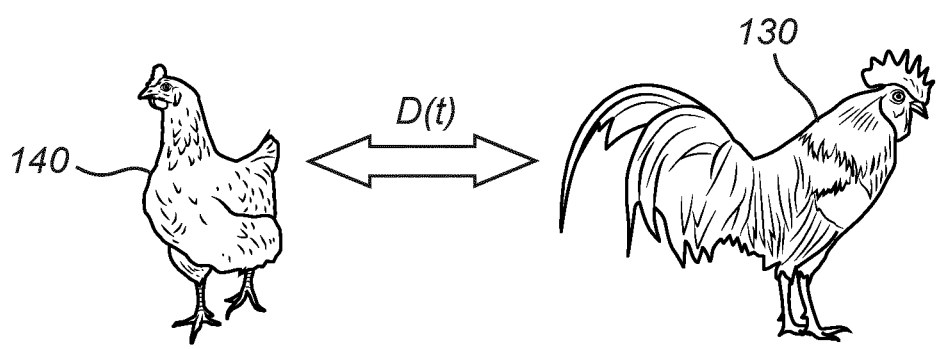

FIG. 5 schematically shows a registration of a motion pattern of the tracked male 130 and the tracked female 140 according to an exemplifying embodiment of the present invention. In this example, the system 100 may be configured to estimate the distance between the tracked male 130 and the tracked female 140 as a function of time, D(t). Based on this estimated distance as a function of time, D(t), the system 100 may register the motion pattern of the tracked male 130 and the tracked female 140. It should be noted that the system 100 may be configured to register alternative interactions between the tracked male 130 and the tracked female 140 than that exemplified in FIG. 5, in order to compare the registered motion pattern(s) with at least one predetermined motion pattern, and determine the likelihood of at least one action associated with a mating behavior between the tracked male 130 and the tracked female 140.

Figure 6:
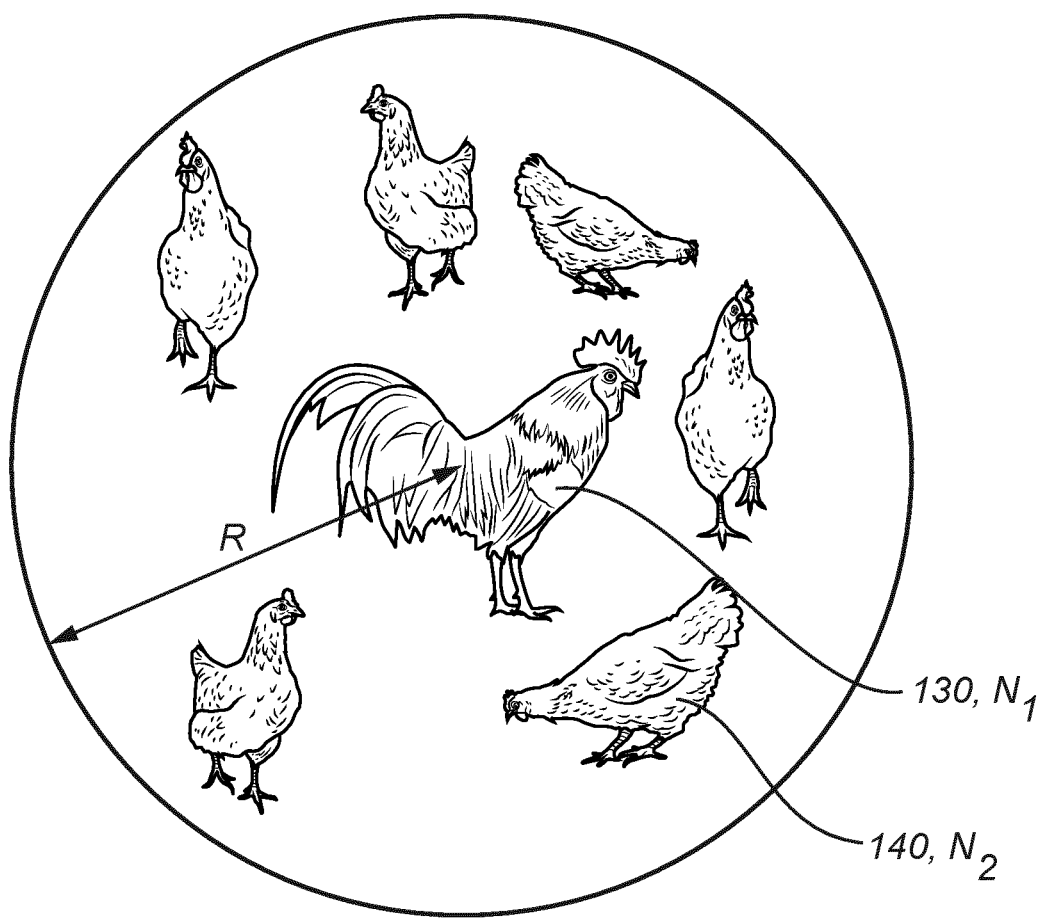

FIG. 6 schematically shows a detection and tracking of a male 130 with respect to a plurality of females 140 of the animal species according to an exemplifying embodiment of the present invention. Here, the system is configured to detect a plurality of females 140 of the animal species within a predetermined radius, R, of the detected male 130. The system 100 is further configured to track the detected male 130 based on the detected plurality of females 140 of the animal species. In combination with, or independently of, this detection and tracking performed by the system, the system may further be configured to determine a number, $N_1$, of the detected male(s) 130, and determine a number, $N_2$, of the detected females 140. The system may furthermore determine a ratio, $N_2/N_1$, between the number of the detected female(s) 140 and the number of the detected male(s) 130, and track the male 130 based on the ratio, $N_2/N_1$. For example, the system may be configured to initialize the tracking of the male 130 and/or female 140 in case the ratio, $N_2/N_1$, is larger than a threshold value, e.g. 10. It will be appreciated that a relatively low value of the ratio, $N_2/N_1$, i.e. a relatively large concentration of males 130 with respect to females 140, could lead to a decrease in the mating e.g. due to fighting between the males 130 and/or an aggressive behavior towards females 140.

Figure 7:
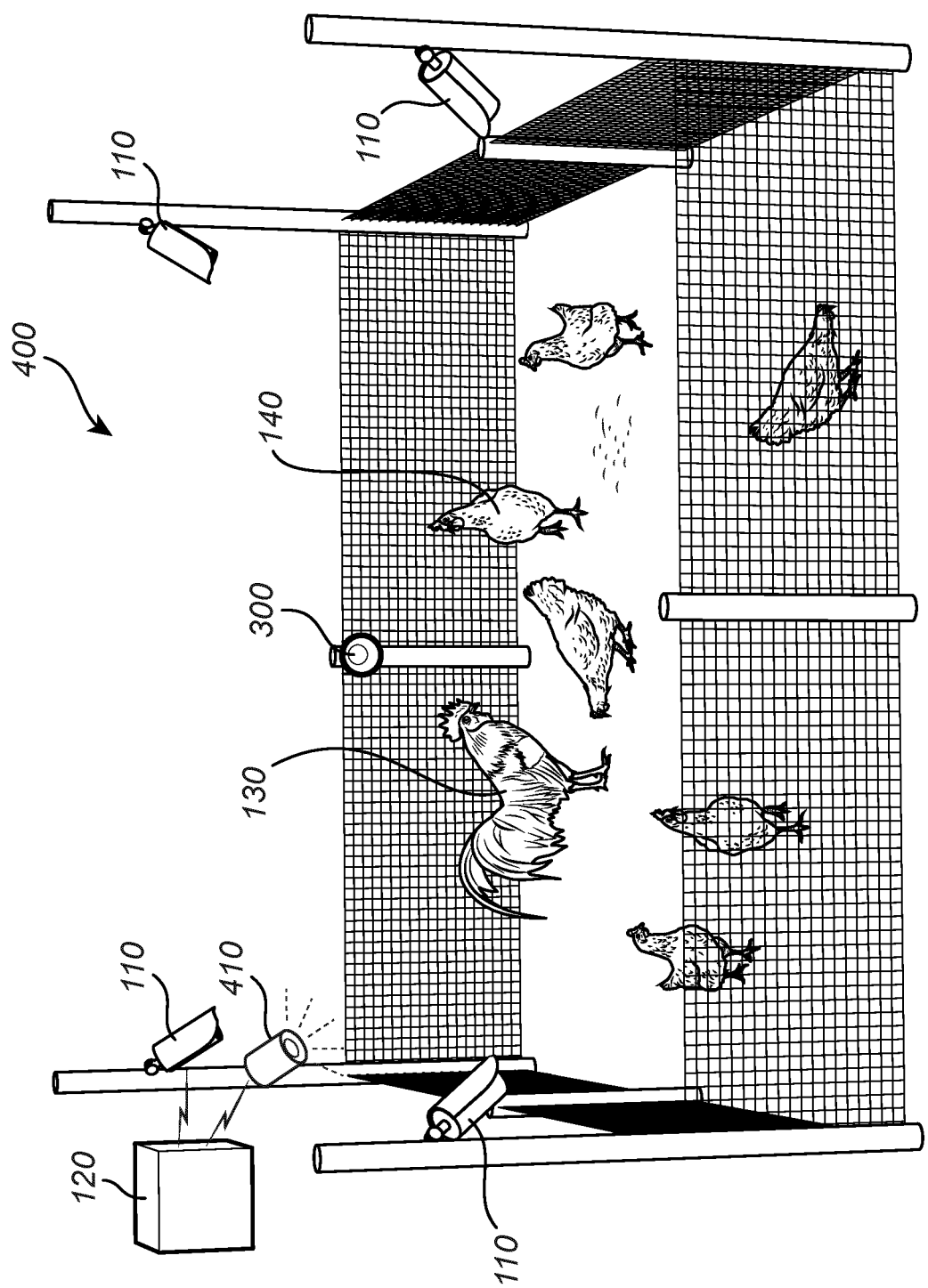

FIG. 7 schematically shows an arrangement 400 for influencing mating behavior of an animal species comprising a system according to any one of the preceding embodiments. As the arrangement 400 comprises the system e.g. as exemplified in FIG. 1 and the associated text, it is referred to FIG. 1 and/or the associated text for an increased understanding. The system of the arrangement 400 is configured to, via a processor 120, detect at least one male 130 of an animal species in a space. The arrangement 400 further comprises at least one light-emitting device 410 arranged to emit light in the space. In FIG. 7, the light emitting device 410 is exemplified as a lamp, but is should be noted that there may be a plurality of light emitting devices (lamps) arranged at different positions. Based on the registered motion pattern(s), via the processor 120 and one or more image-capturing devices 110, and/or the determined likelihood, the system of the arrangement 400 may be configured to control one or more properties (e.g. intensity, color, direction, etc.) of the light emitted from the light-emitting device(s) 410. For example, in case the system determines a relatively low likelihood of one or more actions associated with a mating behavior (e.g. based on a registered motion pattern of the tracked male 130 (e.g. crowing) and/or the tracked female 140 (e.g. fluffing)), the system may be configured to control one or more properties of the light from the light-emitting device(s) 410 emitted in the space, in order to promote the activity of the male(s) 130 related to mating. Analogously, in case the system determines a relatively high likelihood of one or more actions associated with a mating behavior, the system may be configured to control one or more properties of the light from the light-emitting device(s) 410 emitted in the space, in order to impede or obstruct the activity of the male(s) 130 related to mating. According to an example of a (too high) male activity (e.g. if mating events are interrupted by competing males (roosters)), the light from the light-emitting device(s) 410 may be dimmed such as to induce a calm behavior.

It should be noted that the registered motion pattern(s), on which the system of the arrangement 400 may be configured to control one or more properties of the light emitted from the light-emitting device(s) 410, in turn may be associated with quantified levels. For example, the system of the arrangement may be configured to determine the likelihood of one or more actions associated with a mating behavior between the tracked male 130 and the tracked female 140 as a function of time and/or area (or space) and compare this (these) quantified level(s) with a target or threshold. For example, in case the system of the arrangement 400 determines that the likelihood or probability of a number of actions associated with a mating behavior between the tracked male(s) 130 and the tracked female(s) 140 per time and area (or space), is below a target or threshold, the system may be configured to control one or more properties of the light from the light-emitting device(s) 410 emitted in the space, in order to promote the activity of the male(s) 130 related to mating. In other words, the system arrangement 400 may determine that actions such as crowing may be (too) low and may promote the sexual activity via the light-emitting device(s) 410 accordingly. Analogously, in case the system of the arrangement 400 determines that the likelihood or probability of a number of actions associated with a mating behavior between the tracked male(s) 130 and the tracked female(s) 140 per time and area (or space), is above a target or threshold, the system may be configured to control one or more properties of the light from the light-emitting device(s) 410 emitted in the space, in order to impede the activity of the male(s) 130 related to mating. In other words, the system arrangement 400 may determine that actions such as crowing may be (too) high and may impede the sexual activity via the light-emitting device(s) 410 accordingly. Alternatively, or in combination with the example above, the arrangement 400 may be configured to present the data of the determined likelihood of action(s) associated with a mating behavior between the tracked male(s) 130 and the tracked female(s) 140, e.g. on a dashboard in the space, in order to present the information to a farmer.

It should be noted that other (corrective) measures can be performed in order to promote or to impede the mating behavior, such as adding additional males to the space (e.g. young roosters (for increasing competition)), removing males from the space (e.g. roosters, which consequently changes the male/female ratio (e.g. rooster/hen ratio)), change the feeding (e.g. amount and/or the time of day of the feeding), etc.

Figure 8:
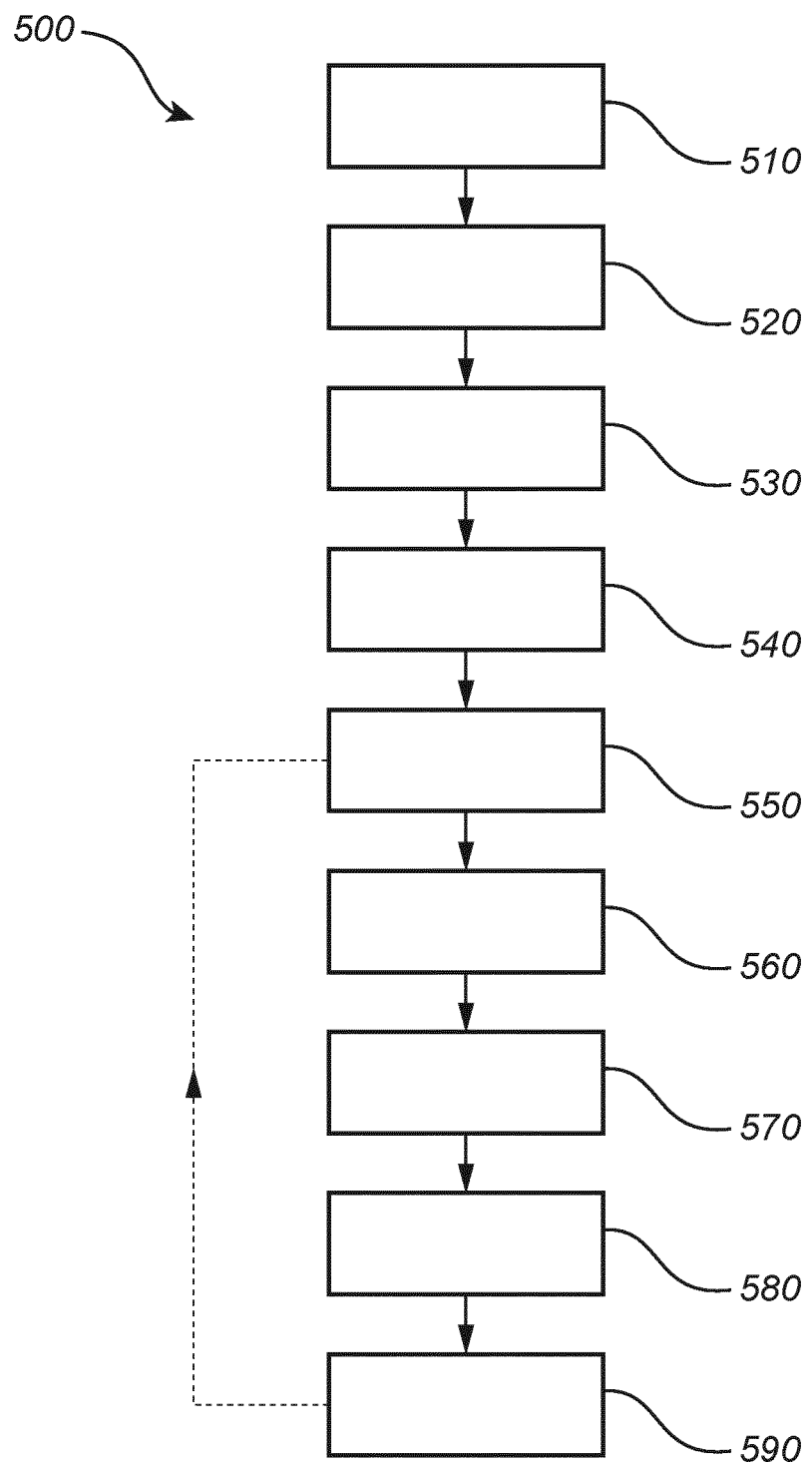

FIG. 8 schematically shows a method 500 for analyzing mating behavior of animals. The method 500 comprises detecting 510 at least one male of an animal species based on at least one image frame of the animal species, and detecting 520 at least one female of an animal species based on at least one image frame of the animal species. The method further comprises tracking 530 a male of the detected at least one male of the animal species, and tracking 540 a female of the detected at least one female of the animal species. The method further comprises registering 550 at least one motion pattern of at least one of the tracked male and the tracked female, comparing 560 the registered at least one motion pattern with at least one predetermined motion pattern, and determining 570 the likelihood of at least one action associated with a mating behavior between the tracked male and the tracked female based on the comparison of the registered at least one motion pattern with the at least one predetermined motion pattern. The method 500 further comprises, based on the determined likelihood, capturing 580, via the at least one image-capturing device, at least one set of time-successive image frames, wherein each image frame of the at least one set of time-successive frame comprises at least one of the tracked male and the tracked female, and registering 590 the at least one motion pattern as a function of the captured at least one set of time-successive image frames. Optionally, the method 500 may iteratively register 550 at least one motion pattern of at least one of the tracked male and the tracked female based on registering 590 the at least one motion pattern as a function of the captured at least one set of time-successive image frames, as indicated by the dashed line. Hence, the method 500 may perform the step of comparing 560 the motion pattern of the tracked male and the tracked female by the captured set(s), in an iterative manner, with a predetermined motion pattern of a mating behavior such as a sexual intercourse (mating) between a male and a female, thereby achieving an improved prediction and/or monitoring of the sexual activity and mating of the animal species.

The person skilled in the art realizes that the present invention by no means is limited to the preferred embodiments described above. On the contrary, many modifications and variations are possible within the scope of the appended claims. For example, the animal species may be different than that shown, the number and/or positions of image-capturing devices (cameras) may be different, etc.

The invention claimed is:

1. A system for analyzing a mating behavior of an animal species, comprising:
   at least one image-capturing device configured to capture a plurality of time-successive image frames, and
   a processor,
   wherein the system is configured to, via the processor,
   detect at least one male of the animal species based on at least one image frame of the plurality of time successive image frames, and
   detect at least one female of an animal species based on at least one image frame of the plurality of time successive image frames,
   wherein the system is further configured to:
   track a male of the detected at least one male of the animal species based on the at least one image frame of the animal species, track a female of the detected at least one female of the animal species based on the at least one image frame of the animal species,
   register at least one motion pattern of at least one of the tracked male and the tracked female,
   compare the registered at least one motion pattern with at least one predetermined motion patterns,
   determine the likelihood of at least one action associated with the mating behavior between the tracked male and the tracked female based on the compare of the registered at least one motion pattern with the at least one predetermined motion patterns, and
   determine the likelihood of a mating between the tracked male and the tracked female based on the determined likelihood of the at least one action associated with the mating behavior between the tracked male and the tracked female.

2. The system of claim 1, further configured to, based on the determined likelihood of the at least one action associated with the mating behavior between the tracked male and the tracked female,
   capture, via the at least one image-capturing device, at least one set of time-successive image frames, wherein each image frame of the at least one set of time-successive frames comprises at least one of the tracked male and the tracked female, and
   register the at least one motion pattern as a function of the captured at least one set of time-successive image frames,
   whereby the system uses the registered at least one motion pattern iteratively in the comparison with the at least one predetermined motion patterns and the subsequent likelihood determination of at least one action associated with the mating behavior between the tracked male and the tracked female.

3. The system of claim 1, further being configured to:
   register a first motion pattern of the tracked male and the tracked female,
   capture, via the at least one image-capturing device, a first set of time-successive image frames, wherein each image frame of the first set of time-successive frame comprises the tracked male and the tracked female, and
   compare the registered first motion pattern with a predetermined first motion pattern of a male and a female of the animal species.

4. The system of claim 3, further being configured to:
   estimate a distance between the tracked male and the tracked female as a function of time, and
   register the first motion pattern of the tracked male and the tracked female based on the estimated distance between the tracked male and the tracked female as the function of time.

5. The system of claim 3, wherein the predetermined first motion pattern comprises a circulation by a male of the animal species around a female of the animal species.

6. The system of claim 1, further being configured to:
   register a second motion pattern of the tracked male, and
   capture, via the at least one image-capturing device, a second set of time-successive image frames,
   wherein each image frame of the second set of time-successive frame comprises the tracked male, and compare the registered second motion pattern with a predetermined second motion pattern of a male of the animal species.

7. The system of claim 1, further being configured to:
   register a third motion pattern of the tracked female, and
   capture, via the at least one image-capturing device, a third set of time-successive image frames,
   wherein each image frame of the third set of time-successive frame comprises the tracked female, and compare the registered third motion pattern with a predetermined third motion pattern of a female of the animal species.

8. The system of claim 1, further being configured to:
   determine a number of the detected at least one male of the animal species,
   determine a number of the detected at least one female of the animal species,
   determine a ratio between the number of the detected at least one female of the animal species and the number of the detected at least one male of the animal species, and
   track the male of the detected at least one male of the animal species based on the ratio.

9. The system of claim 1, further being configured to:
   detect a plurality of females of the animal species within a predetermined radius of the detected at least one male, and track the male of the detected at least one male of the animal species based on the detected plurality of females of the animal species.

10. The system of claim 1, wherein the animal species is chicken, whereby a male of the animal species is a rooster and a female of the animal species is a hen.

11. The system of claim 1, further comprising:
    at least one audio recording device,
    wherein the system is further configured to:
    via the at least one audio recording device, record at least one audio input from at least one of the tracked male and the tracked female, and
    register the at least one motion pattern of at least one of the tracked male and the tracked female based on the at least one audio input.

12. A system for influencing mating behavior of an animal species, comprising:
    at least one image-capturing device configured to capture a plurality of time-successive image frames,
    a processor, and
    wherein the system is configured to, via the processor,
    detect at least one male of the animal species in space based on at least one image frame of the plurality of time successive image frames, and
    detect at least one female of an animal species based on at least one image frame of the plurality of time successive image frames, wherein the system is further configured to:
track a male of the detected at least one male of the animal species based on the at least one image frame of the animal species,
track a female of the detected at least one female of the animal species based on the at least one image frame of the animal species,
register at least one motion pattern of at least one of the tracked male and the tracked female,
compare the registered at least one motion pattern with at least one predetermined motion patterns,
determine the likelihood of at least one action associated with a mating behavior between the tracked male and the tracked female based on the comparison of the registered at least one motion pattern with the at least one predetermined motion patterns, and
determine the likelihood of a mating between the tracked male and the tracked female based on the determined likelihood of the at least one action associated with the mating behavior between the tracked male and the tracked female;
at least one light-emitting device arranged to emit light in the space, wherein the system is further configured to, based on at least one of the registered at least one motion pattern and the determined likelihood,
control at least one property of the at least one light-emitting device.

13. A method for analyzing a mating behavior of an animal species using a processor, comprising:
detecting at least one male of the animal species based on at least one image frame of a plurality of time successive image frames captured by the at least one image-capturing device,
detecting at least one female of an animal species based on at least one image frame of the plurality of time successive image frames,
tracking a male of the detected at least one male of the animal species based on the at least one image frame of the animal species,
tracking a female of the detected at least one female of the animal species based on the at least one image frame of the animal species,
registering at least one motion pattern of at least one of the tracked male and the tracked female,
comparing the registered at least one motion pattern with at least one predetermined motion patterns,
determining the likelihood of at least one action associated with the mating behavior between the tracked male and the tracked female based on the comparing of the registered at least one motion pattern with the at least one predetermined motion patterns, and
determining the likelihood of a mating between the tracked male and the tracked female based on the determined likelihood of the at least one action associated with the mating behavior between the tracked male and the tracked female.

14. The method of claim 13, further comprising, based on the determined likelihood of the at least one action associated with the mating behavior between the tracked male and the tracked female:
capturing at least one set of time-successive image frames, wherein each image frame of the at least one set of time-successive frame comprises at least one of the tracked male and the tracked female, and
registering the at least one motion pattern as a function of the captured at least one set of time-successive image frames, po1 using the registered at least one motion pattern iteratively in the comparing with the at least one predetermined motion patterns and the subsequent likelihood determination of at least one action associated with the mating behavior between the tracked male and the tracked female.

15. A non-transitory computer readable medium comprising instructions executed by a computer for causing the computer to perform a method for analyzing a mating behavior of an animal species, comprises steps of:
detecting at least one male of the animal species based on at least one image frame of a plurality of time successive image frames captured by the at least one image-capturing device,
detecting at least one female of an animal species based on at least one image frame of the plurality of time successive image frames,
tracking a male of the detected at least one male of the animal species based on the at least one image frame of the animal species,
tracking a female of the detected at least one female of the animal species based on the at least one image frame of the animal species,
registering at least one motion pattern of at least one of the tracked male and the tracked female,
comparing the registered at least one motion pattern with at least one predetermined motion patterns,
determining the likelihood of at least one action associated with a mating behavior between the tracked male and the tracked female based on the comparing of the registered at least one motion pattern with the at least one predetermined motion patterns, and
determining the likelihood of a mating between the tracked male and the tracked female based on the determined likelihood of the at least one action associated with the mating behavior between the tracked male and the tracked female.

* * * * *